Dec. 1, 1936.  D. J. STEWART  2,062,337
TEMPERATURE CONTROL SYSTEM
Filed Jan. 7, 1935
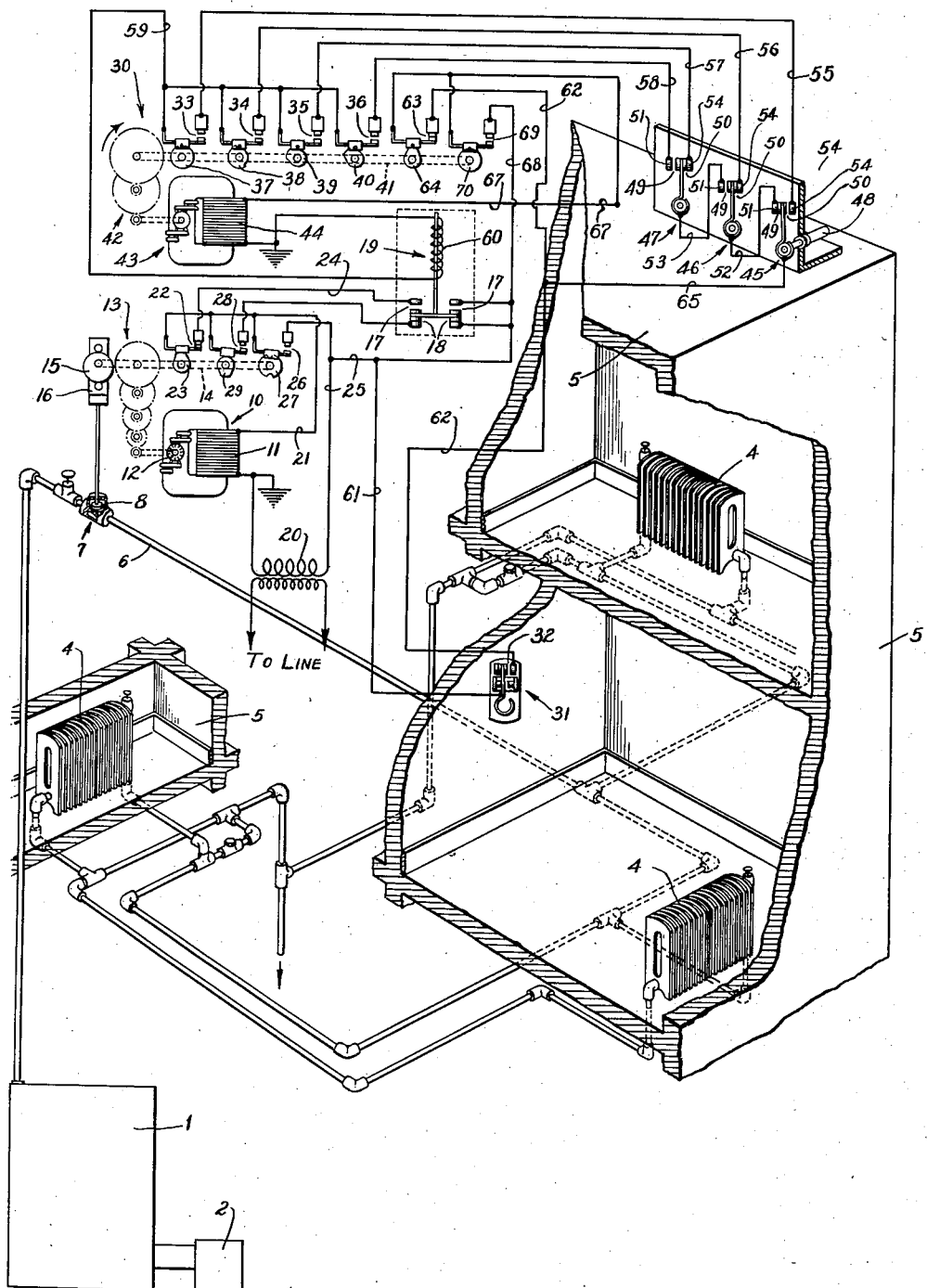
INVENTOR
Duncan J. Stewart
BY
Parker Carlson Pitney Hubbard
ATTORNEYS Patented Dec. 1, 1936

2,062,337

UNITED STATES PATENT OFFICE 2,062,337

TEMPERATURE CONTROL SYSTEM

Duncan J. Stewart, Rockford, Ill., assignor to Howard J. Colman, Rockford, Ill.

Application January 7, 1935, Serial No. 687

7 Claims. (Cl. 236—91)

This invention relates to the control of a heating system for the purpose of maintaining a uniform temperature in a space to be heated thereby and has more particular reference to a control of the type in which heat is supplied to the space intermittently in cycles defined by a timing mechanism and varied automatically in length in accordance with changes in the temperature outside of the building being heated.

While systems of the above character do compensate in part for the inability to adapt a heating system for the maintenance of uniform room temperatures under all weather conditions, it is impossible, by adjustment of the controls in accordance with the outside temperature alone, to maintain under all conditions such close regulation of the room temperature as is ordinarily desired. This is for the reason that the outside temperature is only one of the many factors determining the amount of heat which must be added in order to balance the rate of heat loss from the building and maintain the desired temperature therein.

One object of the invention is to provide a novel cycling control system of the above character which operates to adjust the capacity of the heating system approximately in accordance with the prevailing heat loss from the building and which is supplemented in its controlling action by a thermostat located in the space being heated and operating to so vary the rate of heat delivery at the established capacity of the heating system as to maintain a uniform space temperature.

Another object is to provide a novel cyclic control of the above character in which a heat-supplying cycle will be initiated substantially immediately in response to the call of the space thermostat for heat.

The invention also resides in the novel character of the control apparatus by which the foregoing objects are carried out efficiently and reliably.

Other objects and advantages of the invention will become apparent from the following detailed description taken in connection with the accompanying drawing which is a schematic view of a building and a heating system therefor equipped with controls embodying the novel features of the present invention. While the control may be applied to various types of heating systems without departing from the spirit and scope of the present invention, I have shown the control, for purposes of illustration, in conjunction with a steam heating system in which a boiler 1 heated in any preferred way, as by means of an oil burner 2, constitutes the primary source of heat. Fluid heated in the boiler is conveyed through piping 3 to radiators 4 located in different parts of the building the walls of which are indicated at 5. In the present instance, all of the radiators in a predetermined zone of the building are supplied from a common pipe 6 to which the flow of heating fluid is controlled by a valve 7 having a member 8 movable between open and closed positions to turn the heat on and off.

Here the regulating valve is operated by a power operator comprising an electric motor 10 having a main winding 11 and a rotor 12 connected by speed reduction gearing 13 to a shaft 14 carrying a cam 15 which, in successive half revolutions of the shaft, operates a follower 16 to alternately open and close the valve. The valve opening and closing cycles of the operator are initiated by closure of switches 17 and 18 respectively of an electromagnet 19. Closure of the switch 17 completes a starting circuit for the motor extending from a source 20 of alternating current through the winding 11, a conductor 21, a switch 22 which is closed by a cam 23 when the valve is closed, a conductor 24, the switch 17, and the power conductor 25. When the motor is thus started, its operation is maintained by closure of a parallel circuit through a switch 26 which is allowed to open by a cam 27 after a half revolution of the shaft 14, the switch 22 having been opened in the meantime. Similarly, when the switch 18 is closed, a starting circuit is established through a switch 28 which is closed by a cam 29 when the valve is in open position.

The invention contemplates adjustment of the average capacity of the heating system by the action of a cycling or timing mechanism 30 operating to cause heat to be supplied intermittently in cycles the lengths of which are varied automatically to adjust the maximum heating capacity of the heating system approximately in accordance with the prevailing outside temperature. Then to control the heat supply at the reduced capacity and maintain accurate regulation of the room temperature, the number of heat supplying cycles which may be executed in a given time under the control of the cycling mechanism is determined through the use of a thermostat 31 located in the space being heated and set to close its switch 32 in response to a fall in the space temperature below the predetermined value desired to be maintained.

In the present instance, the timing mechanism comprises a series of switches 33, 34, 35, and 36 operated by cams 37, 38, 39, and 40 on a shaft 41 driven through appropriate speed reduction gearing 42 by an electric motor 43 which may be of the synchronous alternating current type with its winding 44 adapted to be energized from the alternating current source 20. The switches are placed in active control of the magnet 19 one at a time by the action of a plurality of thermostats 45, 46, and 47 having thermostatic elements 48 exposed to the air outside of the building and set to respond to progressively increasing temperatures, for example, 0 degrees, 20 degrees and 40 degrees Fahrenheit. Each thermostat operates to close its switches 49 and 50 when the prevailing outside temperature is above and below the established control point of the thermostat. The contacts 51 of the thermostats 45 and 46 are connected to the tongues of the thermostats 46 and 47 respectively by conductors 52 and 53, and the contacts 54 of the thermostats and the contact 51 of the thermostat 47 are connected respectively by conductors 55, 56, 57, and 58 to the stationary contacts of the switches 33, 34, 35, and 36. The movable contacts of the latter switches are joined by a conductor 59 leading to one terminal of the magnet winding 60. The other terminal is connected to the grounded side of the current source 20.

To render the magnet 19 responsive to the joint action of the cycling mechanism and the room thermostat, one energizing circuit therefor extends from the power conductor 25 through a conductor 61, the room thermostat switch 32, a conductor 62, and conductors 67 and 65 leading to the tongue of the thermostat 45.

From the foregoing, it will be seen that when the outside temperature is below the setting of the thermostat 45 which may be 0 degrees F., the conductors 65 and 55 are connected thereby placing the switch 33 in active control of the magnet winding 60. At temperatures between 0 and 20 degrees, the conductors 65 and 56 are connected and the switch 34 placed in control of the magnet. At outside temperatures between 20 degrees and 40 degrees, the switch 35 will be active, while the switch 36 will be rendered active by a rise in temperature above 40 degrees. It will be obvious that the number of outside thermostats and the number of control switches may be increased as desired.

The invention contemplates shaping of the cams 37, 38, 39, and 40 so that during continuous rotation of the cam shaft 41, the switch which is then in active control of the magnet 19, as determined by the prevailing outside temperature, will be maintained closed for a percentage of the time sufficient to establish an average rate of heat delivery slightly greater than the rate of heat loss from the building under all conditions of the weather at the prevailing outside temperature. In other words, the maximum capacity of the heating system for supplying heat to the zone of the building as determined by the proportion of time during which the active control switch is closed will be somewhat greater than that required to satisfy the heating requirements within the zone at the prevailing outside temperature. For a given building, these conditions may be satisfied by a construction of the cams, so that the respective switches 33, 34, 35, and 36 will be closed for 90, 50, 30, and 15 per cent of the time during each revolution of the cam shaft 41 and opened during the remainder of the revolution. Thus, when the outside temperature is between 0 and 20 degrees F., the heat would be turned on for 50 per cent of the time during which the cam shaft 41 is rotating, while in very cold weather, the heat would be turned on 90 per cent of the time.

To insure that the heat will be turned on substantially immediately each time the room thermostat 31 calls for heat, the motor driven timing mechanism 30 is, in the present instance, arranged to operate intermittently in cycles of fixed length started by the thermostat and terminated with the cam shaft 41 in a position such that the magnet 19 will be energized immediately when the next cycle is initiated. For this purpose, the ungrounded terminal of the motor winding 44 is connected by a conductor 67 to a switch 63. Thus, when the thermostat switch 32 is closed, an energizing circuit for the motor winding 44 will be established through the starting switch 63 which is held closed by the cam 64 in the rest position of the cam shaft 41 but is opened shortly after the cam shaft starts its revolution so as to relieve the current burden on the thermostat switch.

The rest position of the cam shaft 41 is defined through the provision of a maintaining circuit for the motor winding 44 extending from the power conductor 25 through a conductor 68, a switch 69 controlled by a cam 70 on the cam shaft, and the conductor 67. The cam 70 is constructed to close the switch 69 in the initial rotation of the cam shaft under the control of the switches 32 and 63 and to maintain this switch closed until a complete revolution of the cam shaft has been executed. Thus, it will be observed that so long as the room thermostat switch 32 remains closed, the cam shaft 41 will execute successive revolutions because either the starting or the maintaining circuit for the motor 43 will be closed in all positions of the cam shaft. At the end of the revolution of the cam shaft 41 following opening of the thermostatic switch 32, both of these circuits will be opened thereby interrupting the operation of the cycling mechanism.

The control above described operates as follows assuming that the outside temperature is between 0 and 20 degrees F. The valve 7 will remain closed so long as the room temperature is above the value for which the thermostat 31 is set. When the thermostat calls for heat, the starting circuit for the motor 43 will be completed from the power conductor 25 through the conductor 61, the thermostat switch 32, the conductor 62, the then closed switch 63, the conductor 67, and the motor winding 44. In the initial movement of the cam shaft 41 following starting of the motor, all of the switches 33, 34, 35, and 36 will be closed, and an energizing circuit for the magnet 19 will be completed extending from the power conductor 25 through the conductor 61, the thermostat switch 32, the conductors 62, and 65, the then closed switches of the thermostats 45 and 46, the conductor 56, the switch 34, the conductor 59, and the winding 60.

Energization of the magnet 19 results in closure of the switch 17 which initiates a cycle of the valve operator in which the valve member 8 is moved to open or heat-increasing position thereby turning on the heat to the zone. When the switch 63 becomes opened, energization of the magnet 19 will be continued through the maintaining switch 69 until the shaft 41 has turned through a half revolution whereupon the switch 34 will be opened and the magnet circuit interrupted causing the valve 7 to be closed in response to closure of the switch 18. The valve remains closed for the remainder of the cam shaft revolution. In the event that the thermostat is still calling for heat when the first revolution of the cam shaft 41 is completed, the magnet energizing circuit will be maintained by the switch 63 while the maintaining circuit 69 is open, and another revolution of the cam shaft 41 will be initiated.

Successive cycles of the cam shaft will be executed until the room thermostat ceases to call for heat as evidenced by opening of the switch 32. In the event that this occurs while the switch 34 is closed, the magnet 19 will be deenergized immediately since its energizing circuit extends through the thermostat switch, the supply of heat being thereby immediately interrupted. Opening of the thermostat switch will not, however, interrupt the operation of the motor 44 which will continue under the control of the maintaining switch 69 until the normal rest position of the cam shaft has been reached thereby leaving the cam shaft in the position for turning on the heat immediately when its next cycle of the timing mechanism is initiated by closure of the thermostat switch.

I claim as my invention:

1. The combination with a heating system for a building having a regulating device movable between heat-increasing and heat-decreasing positions to govern the supply of heat to a space to be heated, a rotary element, an electric motor for rotating said element unidirectionally, a thermostat responsive to temperature changes in said space and operable when calling for heat to initiate operation of said motor, means operating after said thermostat ceases to call for heat to continue the operation of said motor and terminate the cycle of operation thereof with said element in a predetermined rest position, means responsive to the movement of said element during each cycle of operation thereof and operating to maintain said device in heat-increasing position during the initial part of the cycle and to maintain the device in heat-decreasing position during the remainder of the cycle, said thermostat acting independently of the position of said element to cause movement of said device to heat-decreasing position when the thermostat ceases to call for heat, and means responsive to temperature changes outside of the building and operating to vary the duration of the interval during which said device is disposed in heat-increasing position.

2. The combination with a heating system for a building having a regulating device movable between heat-increasing and heat-decreasing positions to govern the supply of heat to a space to be heated, a rotary element, an electric motor for rotating said element, a thermostat responsive to temperature changes in said space and operable when calling for heat to initiate operation of said motor, means operating after said thermostat ceases to call for heat to continue the operation of said motor and terminate the cycle of operation thereof with said element in a predetermined rest position, means responsive to the movement of said element during each cycle of operation thereof and operating to maintain said device in heat-increasing position during the initial part of the cycle and in heat-decreasing position during the remainder of the cycle.

3. For controlling a heating system of a building, the combination of a regulating device movable between heat-increasing and heat-decreasing positions to control the supply of heat to a space to be heated, a power operator for actuating said device, a second power operator arranged to operate in cycles of fixed lengths, a thermostat in said space adapted to initiate successive cycles of operation of said second operator when calling for heat, means controlling said first mentioned operator and operating in each cycle of the second operator while the thermostat is calling for heat to cause said device to be maintained in heat-increasing position during the initial part of the cycle and in heat-decreasing position during the remainder of the cycle, and means by which the relative lengths of the heat-increasing and heat-decreasing portions of each of said cycles may be varied in accordance with changes in the temperature outside of said building.

4. The combination with a heating system, of a regulating device by which the supply of heat to a space to be heated may be turned on and off, a timing mechanism operable intermittently in cycles of predetermined lengths during the initial part of which the heat is maintained on, the heat being maintained off during the remainder of each cycle, thermostatic means operating in response to the fall of the space temperature below a predetermined value to initiate a cycle of operation of said mechanism, said thermostat acting in response to a rise in the space temperature above a predetermined value to cause movement of said device to heat-decreasing position independently of said mechanism, and means by which the relative lengths of the heat on and off periods of each cycle may be varied in length.

5. The combination with a heating system of a regulating device movable between heat-increasing and heat-decreasing positions to control the supply of heat to a space to be heated, a rotary control element having a normal rest position, means operable during the initial movement of said element out of rest position to maintain said device in heat-increasing position and then to cause movement of the device to heat-decreasing position after the lapse of a time interval, an electric motor for rotating said element, a thermostat in said space having a switch adapted to be closed when the space temperature is below a predetermined value, a second switch actuated by said element and adapted to be closed when the element is in rest position, an energizing circuit for said motor extending through said switches, and a maintaining circuit for said motor including a switch adapted to be closed in the initial movement of said element out of rest position and to be opened while the element is in said position.

6. The combination with a heating system of a regulating device movable between heat-increasing and heat-decreasing positions, a thermostat responsive to temperature changes in the space being heated, a timing mechanism cooperating with said thermostat to initiate movement of said device substantially immediately to heat-increasing position when the thermostat calls for heat and acting, during the continuance of the call for heat, to cause movement of said device alternately to heat-decreasing and heat-increasing positions, and separate thermostatic means responsive to temperature changes externally of said space and cooperating with said mechanism to vary the relative lengths of the periods during which said device remains in heat-increasing and heat-decreasing positions, the length of said initial heat-increasing period following the call of said thermostat for heat being invariable for a given outside temperature.

7. Apparatus for controlling the heating system of a building to maintain a predetermined temperature in the space within the building comprising, in combination, rotary power actuated timing mechanism, tending when in operation to turn the supply of heat to said space alternately on and off in mechanically determined periods, thermostatic means independent of said mechanism arranged to respond to changes in the temperature outside of the building and operating in conjunction with said mechanism to vary the relative lengths of said on and off periods in accordance with the prevailing outside temperature and establish a maximum heating capacity of said system approximating but greater than the rate of heat loss from the space at the outside temperature, and a thermostat in said space operating when the space temperature is above a predetermined value to render said timing mechanism ineffectual in supplying heat and to render said mechanism effectual when the space temperature is below said value.

DUNCAN J. STEWART.